United States Patent [19]
Kearby et al.

[11] Patent Number: 6,032,701
[45] Date of Patent: Mar. 7, 2000

[54] HIGH MOISTURE ALKALI SMOKE FOOD CASING

[75] Inventors: Ronald S. Kearby, Williamsport, Ind.; John J. Wegman, Champaign, Ill.

[73] Assignee: Teepak Investments, Inc., Wilmington, Del.

[21] Appl. No.: 09/015,153

[22] Filed: Jan. 29, 1998

[51] Int. Cl.[7] ...................................................... F16L 11/00
[52] U.S. Cl. ........................ 138/118.1; 138/146; 428/34.8
[58] Field of Search ................................. 138/118.1, 145, 138/146; 428/34.8

[56] References Cited

U.S. PATENT DOCUMENTS

| | | | |
|---|---|---|---|
| 4,207,353 | 6/1980 | Rasmussen et al. | 138/145 |
| 4,356,199 | 10/1982 | Hammer et al. | 138/145 |
| 4,356,200 | 10/1982 | Hammer et al. | 138/145 |
| 4,377,187 | 3/1983 | Chiu | 138/118.1 |
| 4,377,606 | 3/1983 | Chiu | 138/118.1 |
| 4,442,868 | 4/1984 | Smith et al. | 138/118.1 |
| 4,446,167 | 5/1984 | Smith et al. | 426/650 |
| 4,518,619 | 5/1985 | Chiu | 138/118.1 |
| 4,664,861 | 5/1987 | Pritikin et al. | 138/118.1 |
| 4,867,204 | 9/1989 | Ellis et al. | 138/118.1 |
| 5,108,804 | 4/1992 | Oxley et al. | 138/118.1 |
| 5,681,603 | 10/1997 | Underwood | 426/271 |

*Primary Examiner*—James F. Hook
*Attorney, Agent, or Firm*—Michael L. Dunn

[57] ABSTRACT

A premoisturized food casing coated with alkali liquid smoke which does not cause color streaking on encased food product and does not cause smoke buildup on food stuffing equipment. Nevertheless, the premoisturized food casing of the invention still provides the same coloring power and flavor to encased food product, as traditional alkali smoke coated premoisturized food casings. The premoisturized tubular cellulose film food casing of the invention has a moisture content of greater than 24 weight percent and a coating of a smoke solution containing smoke tars and having a solution pH of at least 12 and preferably above about 12.5. The moisture content is preferably from 25 to 40 weight percent and most preferably from 25 to 30 weight percent.

4 Claims, No Drawings

HIGH MOISTURE ALKALI SMOKE FOOD CASING

BACKGROUND OF THE INVENTION

This invention relates to premoisturized food casings containing concentrated liquid smoke coatings, and more particularly relates to such food casings wherein the smoke coatings are formed from alkali smokes.

Premoisturized food casings which contain sufficient moisture for stuffing with food product on modern stuffing equipment are known to those skilled in the art, see e.g. U.S. Pat. No. 4,867,204. Such casings are moisturized with enough water to create a plasticizing effect sufficient to make the casing flexible enough for stuffing without significant breakage. The casing is then packaged in a watertight package. The moisture content in such prepackaged casings is generally greater than about 20 weight percent but usually less than 24 weight percent. Higher percentages are possible, but are generally not used because the casing becomes so flexible as to be more difficult to handle. Further, when additives such as smoke are present, higher moistures have tended to leach such additives from the casing, to create a liquid pool containing additive substances, within the casing package. While none of these problems are critical or insurmountable, their presence is an annoyance. High moisture (greater than 24 weight percent) prepackaged food casings are thus not preferred or generally used.

Alkali liquid smoke is known for use as a smoke additive for foods. Such alkali smokes are particularly suitable for coating onto tubular food casing products for subsequent transfer to food product contained in the food casing. Such alkali smokes and their advantages and uses are for example described in U.S. Pat. Nos. 4,442,868 and 4,446,167. Briefly, smoke vapor is contacted with water to remove smoke components from the smoke vapor stream. The pH of the water is elevated to over 10 and preferably over 12 which causes otherwise insoluble tars to enter into solution. The resulting liquid smoke has much greater coloring power than non-alkali aqueous liquid smokes.

Unfortunately, there are still some problems associated with the use of alkali smokes to coat premoisturized food casings. Because of the high dissolved solids in the alkali smoke, smoke constituents sometimes build up on food stuffing equipment which interferes with processing, can cause breakage and can result in streaked product.

BRIEF DESCRIPTION OF THE INVENTION

In accordance with the invention, there is therefore provided a premoisturized food casing coated with alkali liquid smoke which does not cause color streaking on encased food product and does not cause smoke buildup on food stuffing equipment. Nevertheless, the premoisturized food casing of the invention still provides the same coloring power and flavor to encased food product, as traditional alkali smoke coated premoisturized food casings.

The premoisturized tubular cellulose film food casing of the invention comprises a moisture content of greater than 24 weight percent and a coating of a smoke solution containing smoke tars and having a solution pH of at least 12 and preferably above about 12.5. The moisture content in the casing preferably has a minimum moisture of at least about 25 percent and an upper moisture content of about 30 weight percent. The upper moisture content may be as high as about 40 weight percent.

DETAILED DESCRIPTION OF THE INVENTION

"Food casing" as used herein generally means a tubular plastic film used to encase food product such as sausages, luncheon meats, cheeses, boneless hams, etc. The plastic film is usually made from a cellulose material, e.g. regenerated cellulose.

"Cellulose food casing" means a food casing made from a cellulose film. The cellulose film may be made by regeneration of a derivatized cellulose, e.g. xanthate viscose or may be made by precipitation of cellulose from solution, e.g. solutions of cellulose, derivatized or otherwise, from an amine oxide.

"Premoisturized" as used herein means a food casing which is supplied with enough moisture for sufficient flexibility to permit stuffing without significant breakage. Such casings are often, but no necessarily "shirred", i.e. axially folded and compressed. Premoisturized food casings are encased in watertight containers, e.g. plastic bags, until they are removed for use. Premoisturized food casings are discussed in U.S. Pat. No. 4,867,204.

In accordance with the invention, it has been unexpectedly found that when moisture in prepackaged premoisturized casing is increased above 24 percent and more preferably above 25 percent, and the pH of the applied smoke is at least 12, the above disadvantages of incorporating alkali smoke disappear. Streaking ceases to be a problem, buildup on equipment is drastically reduced or completely eliminated, and breakage due to buildup of smoke residues, ceases to be significant. It is to be understood that it is the pH of the applied alkali smoke that must be at 12 or above. Casing pH after application of the alkali smoke may be lower, e.g. from about 9 to 10.5.

The following examples illustrate, but are not intended to restrict, the present invention.

EXAMPLE 1

Smoke solutions were prepared by dissolving smoke vapor in an aqueous alkali solution. Equal quantities of the smoke solutions were placed in separate containers and were adjusted in pH to 10, 10.5, 11, 11.5, 12, and 12.5 and were permitted to stand to allow tars to settle out. At pH 11 or below, heavy tar buildup occurred. At pH 11.5, there was some tar buildup, but much less than at pH's below 11. At pH 12, very little tar buildup occurred and at pH 12.5, no tar buildup was present.

EXAMPLE 2

Premoisturized, shirred food casings having a coating of alkali smoke are stuffed on conventional stuffing equipment. The premoisturized food casings contain various quantities of water and are at various pH levels. The results are shown in the table.

TABLE

| Example | pH | % Moisture | Tar Buildup |
| --- | --- | --- | --- |
| 1. | 11.5 | 24 | yes |
| 2. | 11.5 | 30 | yes |
| 3. | 12.0 | 23 | yes |
| 4. | 12.0 | 24 | minimal |
| 5. | 12.5 | 16.5 | yes |
| 6. | 12.5 | 24 | no |
| 7. | 12.5 | 35 | no |
| 8. | 13 | 30 | no |

The results clearly show that the combination of high pH and high moisture prevent tar buildup on the food stuffing equipment.

What is claimed is:

1. A premoisturized tubular cellulose film food casing comprising a moisture content of greater than about 24 weight percent and a coating of a smoke solution containing smoke tars and having a solution pH of at least 12.

2. The tubular food casing of claim 1 wherein the moisture content is from 25 to 40 weight percent.

3. The tubular food casing of claim 2 wherein the pH is at least 12.5.

4. The tubular food casing of claim 2 wherein the solution pH is at least 12.5.

* * * * *

UNITED STATES PATENT AND TRADEMARK OFFICE
CERTIFICATE OF CORRECTION

PATENT NO. : 6,032,701
DATED : March 7, 2000
INVENTOR(S) : Ronald S. Kearby, et al.

It is certified that error appears in the above-identified patent and that said Letters Patent is hereby corrected as shown below:

Delete claim 3, and subsitute new claim 3 as follows:
3. The tubular food casing of claim1 wherein the moisture content is from 25 to 30 weight percent.

Signed and Sealed this

Twenty-eighth Day of August, 2001

Attest:

NICHOLAS P. GODICI
Attesting Officer    Acting Director of the United States Patent and Trademark Office